R. W. E. HAYES.
TANK FILLER.
APPLICATION FILED MAR. 5, 1915.

1,157,692.

Patented Oct. 26, 1915.

Witnesses:

Inventor:
Ralph W. E. Hayes
by Banning & Banning
Attys.

UNITED STATES PATENT OFFICE.

RALPH W. E. HAYES, OF GALVA, ILLINOIS, ASSIGNOR OF ONE-HALF TO HAYES PUMP & PLANTER COMPANY, OF GALVA, ILLINOIS, A CORPORATION OF ILLINOIS.

TANK-FILLER.

1,157,692.  Specification of Letters Patent.  Patented Oct. 26, 1915.

Application filed March 5, 1915. Serial No. 12,436.

*To all whom it may concern:*

Be it known that I, RALPH W. E. HAYES, a citizen of the United States, residing at Galva, county of Henry, and State of Illinois, have invented certain new and useful Improvements in Tank-Fillers, of which the following is a specification.

The present invention relates to a device adapted and arranged for use in connection with power spraying or other devices, for filling the tank of such devices with liquid.

The objects of the invention are to provide a device operating on the principle of an ejector for supplying the necessary pressure to force the liquid through the liquid conduit; to so arrange the parts as to enable a relatively large volume of liquid to be forced by a relatively low pressure; to provide a device which is cheap and simple of construction, and which contains no involved parts liable to become disarranged; and to form the device of a practically one-piece construction.

The invention further consists in the features of construction and combination of parts hereinafter described and claimed.

Figure 1:
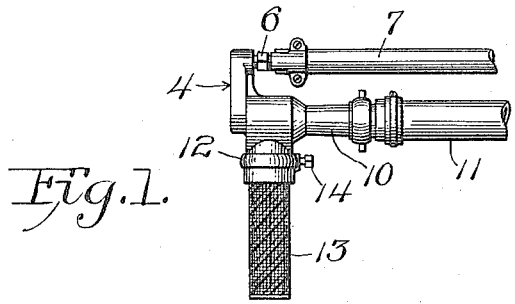
Figure 2:
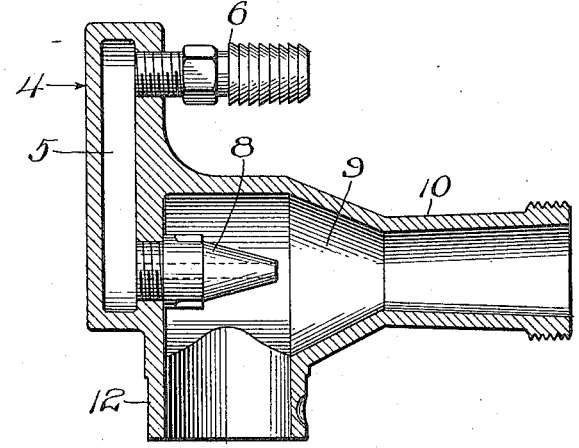
Figure 3:
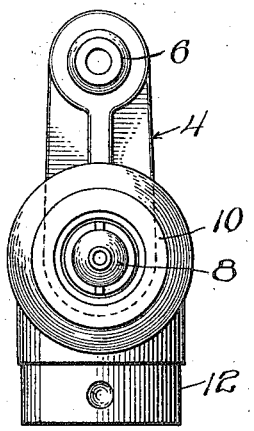

In the drawings: Figure 1 is an elevation showing the device of the present invention with the pressure conduit, liquid conduit, and liquid inlet member in position; Fig. 2 is a longitudinal section with the conduits and inlet member removed; and Fig. 3 is a front view of the parts shown in Fig. 2.

In connection with the use of power spraying devices, a tank is mounted upon the wagon which carries the pump and other mechanism of the sprayer. These tanks are of considerable capacity, ordinarily about 200 gallons, although, of course, as far as the present invention is concerned, the size of the tank is immaterial. Into such tanks are placed a chemical composition and water, and it is obviously highly desirable to have some means of mechanically pumping the water into the tank. In the present invention, an attachment is provided by which the pump pressure can be utilized for the purpose of forcing the water into such tanks, and in which the water is forced in a sufficiently large volume to effect a rapid filling of the tank.

The device consists of a body 4 of one-piece construction, which body is formed with a chamber 5, which may be termed the pressure chamber. Communicating with this chamber is a nipple 6, to which is attached a hose or other conduit 7, leading from a suitable source of pressure supply. This conduit, therefore, may be termed the pressure conduit. Also communicating with the chamber 5 is a nozzle or jet 8 which extends into a chamber 9 of Venturi formation, which may be termed the liquid chamber. This chamber 9 is formed in a tubular member 10, to which is attached a hose or other conduit 11, leading to the tank. This may be termed the fluid conduit. The body 4 is further provided with a neck 12 which may be termed the liquid inlet, to which is attached a member 13, in the form of a strainer; and this member 13 is detachably secured by a suitable locking member 14. Of course, the construction of this member 13 is immaterial, since it is nothing more than a short tube which extends into the water or other liquid at the source of liquid supply.

It will be noted that the conduit 11 is much larger than the conduit 7. I am able to employ this construction through the use of the nozzle 8 and the Venturi chamber, by means of which an ejector mechanism is formed, so that the pressure which passes through the conduit 7 is increased when it acts upon the liquid by passing through the nozzle and Venturi chamber, and a larger volume of liquid can be forced through the conduit 11 than would otherwise be the case.

In the operation of the device, the conduit 7 is attached to a suitable source of pressure, as, for instance, the pump or pressure reservoir of the spraying appliance, and pressure is transmitted through this conduit into the chamber 5, and through the nozzle 8, and then is projected into the venturi, forming an ejector, and creating a suctional force, as will be obvious from the drawings, which draws the fluid, whether it be water or otherwise, through the member 13, and into the chamber 9, and thence forces it through the conduit 11 into the tank.

It is to be noted that, except for the nozzle 8, nipple 6, and member 13, the entire device is of one-piece construction, making it very strong and durable, and rendering it less liable to leak. By the use of the ejector created by the nozzle and venturi, a substantial volume of water may be forced into the tank by a relative low pressure, and hence the speed of filling is materially increased over a construction which did not augment the pressure supplied from the ordinary source of pressure.

I claim:

In a device of the class described, the combination of a one-piece body portion formed with a base having a pressure chamber therein, a nipple outwardly extending from said base and communicating with said pressure chamber, a nozzle communicating with said pressure chamber, a tubular member outwardly extending from the base, the interior of said member forming a liquid chamber, and said nozzle extending into said liquid chamber, a liquid inlet communicating with said liquid chamber at a point adjacent said nozzle, a pressure conduit attached to said nipple, a liquid conduit attached to said tubular member and said conduits both extending directly outward from the upper side of the body portion, substantially as described.

RALPH W. E. HAYES.

Witnesses:
C. SHURLEY,
H. O. McCREIGHT.

Copies of this patent may be obtained for five cents each, by addressing the "Commissioner of Patents, Washington, D. C."